(12) United States Patent
Driver et al.

(10) Patent No.: US 12,317,086 B1
(45) Date of Patent: May 27, 2025

(54) ELECTRONIC DEVICE PROGRAM BLOCKER

(71) Applicant: Brick LLC, Colgate, WI (US)

(72) Inventors: Thomas John Killian Driver, Hubertus, WI (US); Zachary Mario Nasgowitz, Colgate, WI (US)

(73) Assignee: Brick LLC, Colgate, WI (US)

(*) Notice: Subject to any disclaimer, the term of this patent is extended or adjusted under 35 U.S.C. 154(b) by 0 days.

(21) Appl. No.: 18/884,663

(22) Filed: Sep. 13, 2024

(51) Int. Cl.
*H04W 12/47* (2021.01)
*H04W 12/63* (2021.01)

(52) U.S. Cl.
CPC .......... *H04W 12/47* (2021.01); *H04W 12/63* (2021.01)

(58) Field of Classification Search
None
See application file for complete search history.

(56) References Cited

U.S. PATENT DOCUMENTS

| | | | |
|---|---|---|---|
| 2011/0314539 A1* | 12/2011 | Horton | H04W 12/30 726/20 |
| 2020/0296178 A1* | 9/2020 | Coyle-Gilchrist | H04M 1/72412 |
| 2021/0264043 A1* | 8/2021 | Rigter | H04M 1/72412 |

OTHER PUBLICATIONS

Blok: Distraction-Free mornings and evenings, 2024, Accessed on Sep. 11, 2024 at https://blok.so/.
Unpluq: Take Control of Addictive Tech, 2024, Accessed on Sep. 11, 2024 at https://www.unpluq.com/.

* cited by examiner

*Primary Examiner* — Nelson S. Giddins
(74) *Attorney, Agent, or Firm* — Polygon IP, LLP

(57) ABSTRACT

A blocker device that changes a configuration of a user smart device. The blocker device emits an active or passive signal. The user smart device, when disposed within a certain distance of the blocker device, receives such a signal to determine that the blocker device is disposed within a certain distance of the user device. Upon detection of the blocker device being disposed proximate the user device, the user device's configuration is modified so that user access to at least one or more applications on the user device is changed.

20 Claims, 8 Drawing Sheets

ELECTRONIC DEVICE PROGRAM BLOCKER

FIELD OF TECHNOLOGY

This patent application relates generally to electronic systems and devices, and more specifically to blocker devices configured to effectuate configuration changes within an associated user device.

BACKGROUND

Smart electronic devices, such as smartphones, tablets, and wearable devices, have become increasingly ubiquitous and powerful. While smart electronic devices have the capability to deliver ever increasing amounts of media and information to a user, they also have become an endless source of distraction to many users. Indeed, these devices have addictive qualities and many users have become conditioned to constantly using their smart electronic devices and, indeed, suffer from withdrawal if they do not obtain the dopamine hit that is provided with usage of those devices. This addiction to electronic devices has come at a great cost to society, leading to relationship failure, poor work performance, atrophying of social skills, and other costs to many users. Indeed, abusive use of smart electronic devices has reshaped and torn the very fabric of many societies.

SUMMARY

Described are methods and systems for blocker devices configured to effectuate configuration changes within an associated user device.

Clause 1. A computer program product comprising non-transitory computer-readable medium storing program code configured to be executed by one or more processors to cause a user device to perform operations comprising: receiving first signal data communicated by a signal module of a first blocker device disposed proximate the user device, wherein the first signal data comprises a first security tag associated with the first blocker device; authenticating the first blocker device based on the first security tag of the first signal data; automatically selecting, based on the receiving the first signal data and the authenticating the first blocker device, a first configuration of the user device, wherein the first configuration prevents a user from interacting with at least one application of the user device; and automatically setting the user device into the first configuration.

Clause 2. The computer program product of clause 1, wherein the first signal data is Near Field Communications (NFC) data, and wherein the first security tag is an NFC protocol first security tag.

Clause 3. The computer program product of clause 1, wherein the first signal data further comprises configuration data, and wherein the first configuration is based on the configuration data communicated by the signal module of the first blocker device.

Clause 4. The computer program product of clause 1, wherein the operations further comprise: receiving second signal data communicated by the signal module of the first blocker device disposed proximate the user device; automatically selecting, based on the receiving the second signal data, a second configuration of the user device, wherein the second configuration is different from the first configuration; and automatically setting the user device into the second configuration.

Clause 5. The computer program product of clause 4, wherein the second signal data comprises a second security tag associated with the first blocker device, wherein the second security tag is a periodic refresh of the first security tag, and wherein the operations further comprise: authenticating the first blocker device based on the second security tag of the second signal data, wherein the automatically selecting is further based on the authenticating the second security tag.

Clause 6. The computer program product of clause 5, wherein the second configuration provides the user full access to the user device.

Clause 7. The computer program product of clause 1, wherein the operations further comprise: receiving second signal data communicated by a signal module of a second blocker device disposed proximate the user device, wherein the second signal data comprises a second security tag associated with the second blocker device; authenticating the second blocker device based on the second security tag of the second signal data, the authenticating the second blocker device comprising determining that the second blocker device is associated with the first blocker device for interacting with the user device; automatically selecting, based on the receiving the second signal data and the authenticating the second blocker device, a second configuration of the user device, wherein the second configuration is different from the first configuration; and automatically setting the user device into the second configuration.

Clause 8. The computer program product of clause 1, wherein the first configuration is stored and accessed from a memory of the user device.

Clause 9. The computer program product of clause 1, wherein the first configuration is provided by the blocker device.

Clause 10. A blocker device, comprising: a body comprising a first body portion and a second body portion; and a signal module, coupled to the first body portion, wherein the signal module is configured to: provide first signal data to be received by a user device disposed proximate the blocker device, wherein the first signal data comprises a first security tag associated with the blocker device, and wherein the first signal data is configured to cause the user device to: authenticate the blocker device based on the first security tag of the signal data; and automatically set the user device into a first configuration based on the user device receiving the first signal data and the authenticating the first security tag.

Clause 11. The blocker device of clause 10, further comprising: a memory configured to store the first configuration data indicating the first configuration, wherein the signal module is further configured to provide the first configuration data to the user device.

Clause 12. The blocker device of clause 11, wherein the memory is internal memory of the signal module.

Clause 13. The blocker device of clause 11, wherein the memory is physically separate from the signal module.

Clause 14. The blocker device of clause 10, wherein the first signal data is Near Field Communications (NFC) data, and wherein the first security tag is an NFC protocol first security tag.

Clause 15. The blocker device of clause 10, further comprising: a magnet, coupled to the second body portion.

Clause 16. A user device comprising: a communications module; a non-transitory memory; a processor, configured to receive instructions from the non-transitory memory to perform operations comprising: receiving first signal data communicated by a signal module of a first blocker device disposed proximate the user device, wherein the first signal data comprises a first security tag associated with the first blocker device; authenticating the first blocker device based on the first security tag of the first signal data; automatically selecting, based on the receiving the first signal data and the authenticating the first blocker device, a first configuration, wherein the first configuration prevents a user from interacting with at least one application; and automatically setting the first configuration.

Clause 17. The user device of clause 16, wherein the first signal data is Near Field Communications (NFC) data, and wherein the first security tag is an NFC protocol first security tag.

Clause 18. The user device of clause 16, further comprising: a location module, wherein the operations further comprise: receiving, with the location module, location data indicating a location of the user device; and determining the location of the user device, wherein the first configuration is further selected based on the location of the user device.

Clause 19. The user device of clause 16, wherein the automatically setting the first configuration comprises automatically setting the user device into the first configuration.

Clause 20. The user device of clause 16, wherein the automatically setting the first configuration comprises: providing, with the communications module, the first configuration to a secondary device, wherein the automatically setting the first configuration comprises causing the secondary device to be automatically set in the first configuration.

These and other examples are described further below with reference to figures.

BRIEF DESCRIPTION OF THE DRAWINGS

The included drawings are for illustrative purposes and serve only to provide examples of possible structures and operations for the disclosed inventive systems, apparatus, methods, and computer program products for blocker devices. These drawings in no way limit any changes in form and detail that may be made by one skilled in the art without departing from the spirit and scope of the disclosed implementations.

DETAILED DESCRIPTION

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with specific examples, it will be understood that these examples are not intended to be limiting.

Some implementations of the disclosed systems, apparatus, methods and computer program products are configured for implementing blocker devices for automating configuring a user smart device by changing access to one or more applications on the smart device, upon detection of the blocker device within the vicinity of the user smart device. In various embodiments, user smart devices may include, for example, smartphones, tablets, wearable devices, and/or other such devices that may provide information to a user (e.g., based on user input).

In certain embodiments, a blocker device may be configured to interface with a user device. That is, the blocker device may be configured to provide an active (e.g., a controller of the blocker device determines when to provide a signal) or passive signal (e.g., when a signal is provided in response to an external stimulus, such as an external magnetic field). The signal, when received by the user device, may change a configuration of the user device. In certain embodiments, the user device configuration may be changed so that certain programs/applications may be unavailable to a user of the user device. In other instances, the user device configuration may be changed so that certain unavailable programs/applications may become available to the user.

It is appreciated that, for the purposes of this disclosure, when an element includes a plurality of similar elements distinguished by a letter or follow-on numeral following the ordinal indicator (e.g., "170A" and "170B", "170-1" or "170-2", or "170A-1" and "170A-2") and reference is made to only the ordinal indicator itself (e.g., "170"), such a reference is applicable to all similar elements.

System Examples

Figure 1:
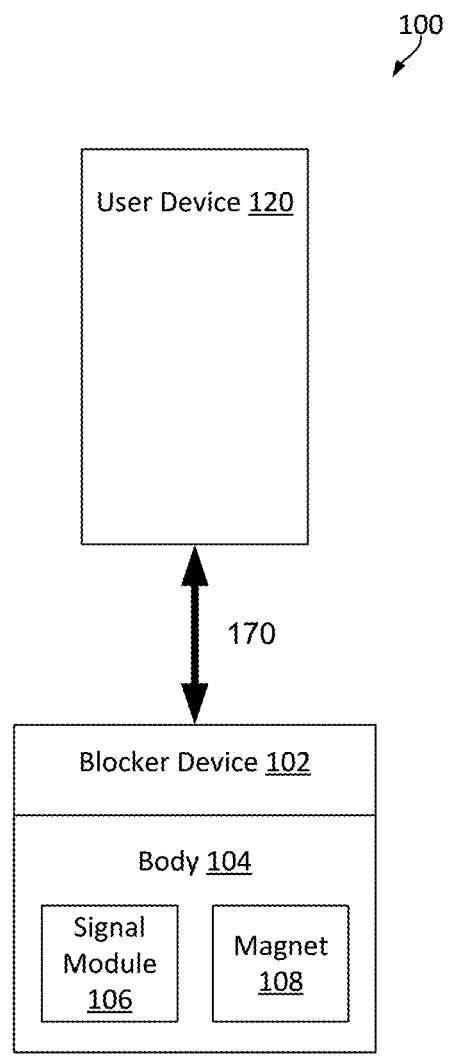
FIG. 1 illustrates a block diagram of an example system, in accordance with certain embodiments.

FIG. 1 illustrates a block diagram of an example system, in accordance with certain embodiments. FIG. 1 illustrates system 100, which includes blocker device 102 and user device 120. Blocker device 102 may be communicatively coupled to user device 120 via communications channel 170. Communications channel 170 may be any wired and/or wireless communication channel, in any appropriate standard (e.g., Bluetooth, Near-Field Communications, WiFi, Zigbee, 3G, 4G, 5G, and/or other such appropriate communications protocols) that allows for data to be communicated between user device 120 and blocker device 102. In certain embodiments, blocker device 102 may actively or passively communicate such data.

User device 120 may be any appropriate electronic device, such as a smartphone, tablet, wearable device, desktop, laptop, and/or other such device. User device 120 may include processor, memory, communications modules, batteries, user interfaces, location modules, and/or other such elements, as appropriate and further detailed in FIG. 2.

Figure 2:
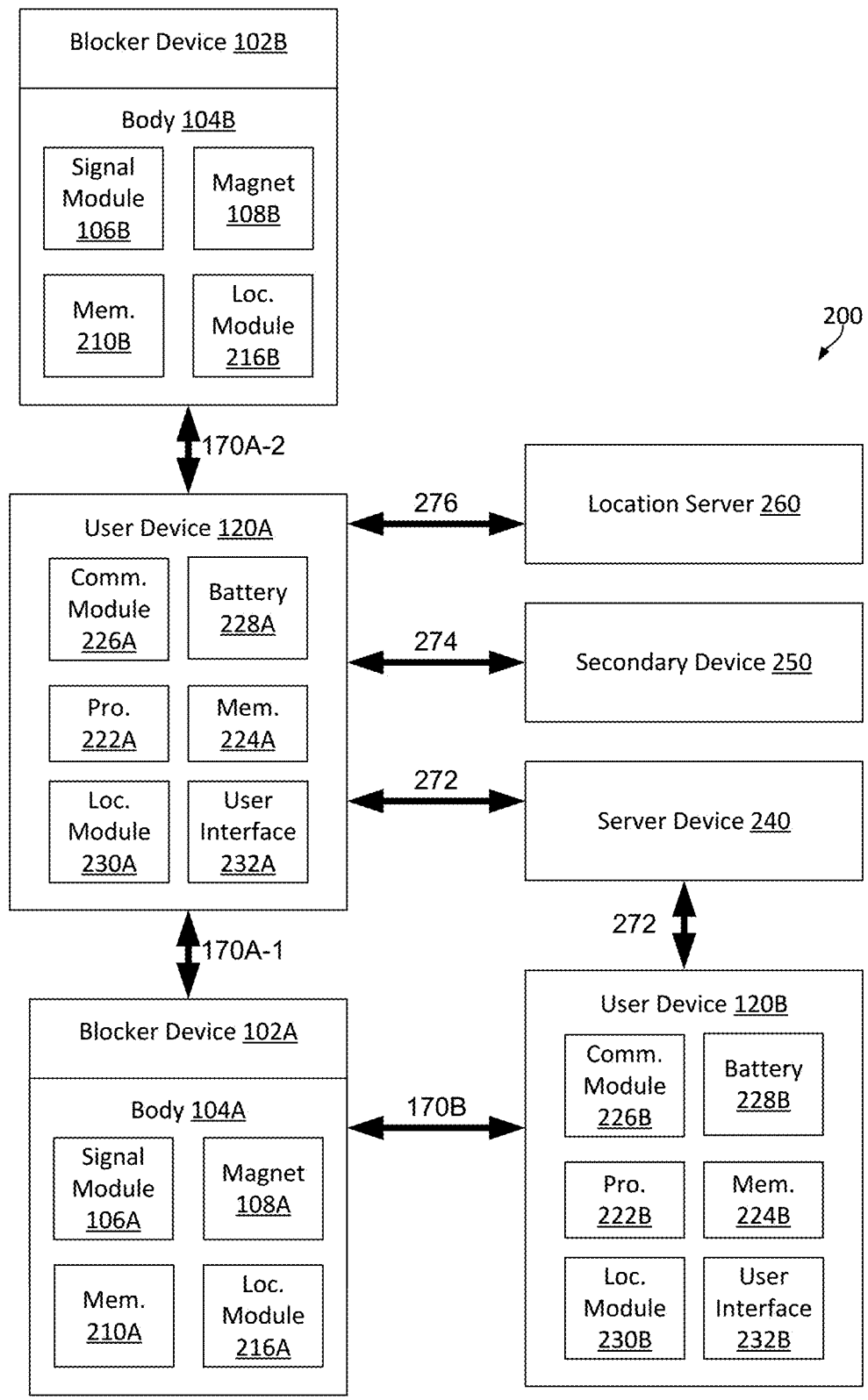
FIG. 2 illustrates a block diagram of a further example system, in accordance with certain embodiments.

In system 100, blocker device 102 may include body 104, signal module 106, and magnet 108, as well as other elements further detailed in FIG. 2. Body 104 may be, for example, a plastic, composite, metal, wood, or other casing configured to enclose other elements of blocker device 102. Body 104 may, in various embodiments, be formed through molding, three-dimensional printing, casting, machining, composite lay-up, and/or any other appropriate technique. Certain embodiments of body 104 may include a plurality of different parts and such parts may be coupled together via welding, adhesive joining, mechanical fasteners, snap features, and/or any other appropriate technique.

Signal module 106 may be any module configured to allow for blocker device 102 to communicate with user device 120 or another such device. Signal module 106 may communicate such data via any appropriate protocol, such as via Bluetooth, NFC, Zigbee, or other short-range communications protocols. For example, signal module 106 may be an NFC module that communicates via Near-Field communication protocols. In various embodiments, signal module 106 may allow for blocker device 102 to pair with user device 120. Pairing of blocker device 102 to user device 120 allows for data to be communicated between blocker device 102 and user device 120.

As part of data communications, user device 120 may receive authenticating data from blocker device 102 (e.g., password, device ID, authenticating NFC tag or authentication data as a portion of the NFC data, and/or other authenticating techniques). User device 120 may then determine if blocker device 102 is a device that is validly paired to user device 120.

Receipt of data communicated by blocker device 102 may indicate that blocker device 102 is positioned proximate user device 120. Upon receipt of such data and authentication of blocker device 102, user device 120 may change operating configurations. Such operating configuration changes may include, for example, allowing or preventing a user of user device 120 from accessing certain programs/applications, allowing or preventing use of certain hardware of user device 120 (e.g., a GPS location module and/or a long-distance data module), changing a maximum processing speed or battery output, allowing or preventing certain inputs or instructions from being provided to user device 120 (e.g., turning a touchscreen one or off), and/or another such configuration change.

In certain embodiments, the changes to the configuration may be determined via data communicated by blocker device 102 and/or via data stored on user device 120. For example, user device 120 may include a memory (e.g., memory 224 of FIG. 2) that stores configuration files. Upon detection of the proximate location of blocker device 102 proximate user device 120, a processor (e.g., processor 222 of FIG. 2) may access such configuration files from the memory. Additionally or alternatively, blocker device 102 may store such configuration files within a memory of blocker device 102 (e.g., within memory of signal module 106 and/or memory 210 in FIG. 2 that is separate from signal module 106). Blocker device 102 may then accordingly communicate such configuration files to user device 120 via data from signal module 106.

The user device 120 may then be configured according to the configuration data accessed. For example, user device 120 may be configured so that certain programs/applications, hardware, and/or inputs/instructions are made available or prevented from access by the user of user device 120. Additionally or alternatively, user device 120 may be placed in a low processing, memory, power, or other throttled operating mode.

Magnet 108 may allow for body 104 of blocker device 102 to be coupled to various metallic surfaces. Thus, for example, magnet 108 may allow for blocker device 102 to be magnetically coupled (e.g., attached) to various metallic surfaces, such as a metal panel. Thus, blocker device 102 may be fixed in position and user device 120 may be positioned proximate the fixed blocker device 102 to change an operating configuration of user device 120.

FIG. 2 illustrates a block diagram of a further example system, in accordance with certain embodiments. FIG. 2 illustrates system 200 that includes various blocker devices, user devices, and other devices. System 200 may illustrate various different configurations of systems that utilize blocker devices.

As shown in FIG. 2, system 200 may include a plurality of blocker devices, including blocker device 102A and blocker device 102B, as well as a plurality of user devices, including user device 120A and user device 120B. Furthermore, system 200 may include server device 240, secondary device 250, and location server 260. Various embodiments of such systems may include more or fewer devices than that described in FIG. 2.

The various devices of system 200 may be communicatively coupled with communication channels 170, 272, 274, and/or 276, which may include any such wired or wireless communication channels described herein. In certain embodiments, communication channels 170 may be short-ranged communication channels as described herein, allowing for a blocker device to communicate with a user device that is disposed proximate the blocker device (e.g., within a range of less than a feet). Communication channels 272, 274, and/or 276 may include any appropriate short-ranged or long-ranged communication channels, such as the short-ranged communication channels described herein as well as wired and/or wireless internet, global positioning data, Ethernet, Local Area Networks, and/or other such communication protocols.

User device 102 may include signal module 106, magnet 108, memory 210, and location module 216. The disclosure of FIG. 1 for signal module 106 and magnet 108 may apply to that of blocker device 102 of FIG. 2 as well. The various elements of blocker device 102 may be electrically and/or communicatively coupled with any wired or wireless circuitry.

Memory 210 may be any type of memory device configured to store data and/or instructions. Memory 210 may be, for example, a hard drive, a solid state device, and/or random access memory (RAM) and may include transitory or non-transitory computer-readable media. Memory 210 may be configured to store configurations for user device 120. In certain embodiments, memory 210 may be physically separate from signal module 106 and/or may be memory integrated within signal module 106. Signal module 106 may include its own memory to store authentication data. Various embodiments of blocker device 102 may utilize such memory to also store configuration data.

Location module 216 may be configured to receive location data from an external device, such as, for example, a GPS satellite, a cellular tower, or another such device configured to provide location data. Various techniques described herein may utilize location data. While such techniques are generally described with reference to location data provided to user device 120, it is appreciated that, additionally or alternatively, the location data may be provided to blocker device 102. Blocker device 102 may then select or determine the appropriate configuration for user device 120.

Furthermore, it is appreciated that blocker device 102 may include a processor in certain embodiments and/or the various modules of blocker device 102 may include processing power. Thus, for example, such processing capability may be utilized to determine or select the appropriate configuration for user device 120.

User device 120 may include communications module 226, battery 228, processor 222, memory 224, location module 230, and user interface 232. The various elements of user device 120 may be electrically and/or communicatively coupled with any wired or wireless circuitry.

Communications module 226 may be a short-ranged communications module configured to interface with signal module 106, as well as with other devices. User device 120 may include one or a plurality of such modules and such modules may be configured to communicate via the same communications protocol as signal module 106, as well as with via other communications protocols (e.g., to communicate with secondary device 250). Thus, for embodiments where signal module 106 communicates via NFC or Bluetooth protocol, communications module 226 may also communicate via NFC or Bluetooth protocol.

Communications module 226, or another communications module of user device 120, may also communicate via long-ranged communications protocol, such as any wired or wireless Internet appropriate communications protocol (e.g., 3G, 4G, 5G, Ethernet, WiFi, LAN, or other such protocols). Such long-ranged communications protocol may allow for user device 120 to communicate with server device 240 and/or secondary device 250.

Processor 222 may be a single or multi-core processor. As described herein, processor 222 may be configured to perform various operations as described herein. Such processors may be configured, when appropriate instructions are provided (e.g., from a memory such as memory 224), to perform processing operations of any of the techniques described herein. Processor 222 may be any type of single or multi-core processor that allows for electronic data processing. It is appreciated that processor 222 may perform the techniques described herein utilizing one or more databases, modules, and/or other system components as described herein. Accordingly, processor 222 may perform the techniques described herein while calling upon data stored within memory 224 (or memory 210 for processing performed by blocker device 102) and/or utilizing the data of one or more modules described herein.

Memory 224 may be any type of memory device configured to store data and/or instructions. Memory 224 may be, for example, a hard drive, a solid state device, and/or random access memory (RAM) and may include transitory or non-transitory computer-readable media. Memory 224 may be configured to store instructions for performing the techniques described herein, configured to store configuration data, and/or configured to store other such data.

Similar to location module 216, location module 230 may be configured to receive location data from an external location device, such as, for example, a GPS satellite, a cellular tower, or another such device configured to provide location data.

User interface 232 may be an interface configured to receive inputs from a user. In various embodiments, user interface 232 may be, for example, a touchscreen, camera, microphone, accelerometer, or other element configured to receive commands from a user. User interface 232 may receive such inputs from a user and provide data indicating such inputs to memory 224 for storage or processor 222 for determination of user commands. For example, user interface 232 may be configured to receive indication of various configurations from a user, and such configurations may be stored within memory 224 (or communicated to blocker device 102 for storage within memory 210).

Battery 228 may be a battery configured to store electrical power. Electrical power from battery 228 may be provided to the various components of user device 120 through various electrical circuits. It is appreciated that other devices described herein may include their own batteries, or may not include such batteries if power requirements are minimal.

Blocker device 102A may be associated with user device 120A as well as user device 120B. Thus, blocker device 102A may communicate with user device 120A via communications channel 170A-1 and communicate with user device 120B via communications channel 120B. Both user device 120A and user device 120B may have separately paired with blocker device 102A and obtained authentication data to authenticate blocker device 102A when blocker device 102A is disposed proximate the respective user device.

User device 120A may be additionally associated with blocker device 102B. Thus, one user device may be associated with a plurality of blocker devices. User device 120A may store (e.g., from memory 224) or access (e.g., from memory 210) data indicating a configuration that user device 120A is placed in or changed to upon detection of one of blocker device 102A or blocker device 102B. Detection of one of blocker device 102A or blocker device 102B may result in user device 120 accessing the appropriate data to place user device 120A or user device 120B in the appropriate configuration.

Thus, for example, memory 224A of user device 120A may store data for a first configuration and a second configuration associated with blocker device 102A and store data for a first configuration and a second configuration associated with blocker device 102B.

Alternatively, memory 210A of blocker device 102A may store data for a first configuration and a second configuration associated with user device 120A (as well as store data for a first configuration and a second configuration associated with user device 120B). Additionally or alternatively, memory 210B of blocker device 102B may store data for a first configuration and a second configuration associated with user device 120A.

In certain such embodiments, the details of the first configuration and second configuration may be provided by communication module 226 to blocker device 102 for storage within memory 224. For example, user interface 232 may receive input from a user of user device 120. The input may provide data for the various configuration(s) (e.g., based on selections or commands provided by the user via user interface 232, such data may indicate, for example, which programs/applications are available to use in the various configurations). Data indicating the configuration(s) may then be communicated by communications module 226 to blocker device 102 for storage in memory 210.

In certain embodiments, user device 120A may be placed in a first configuration (e.g., a configuration restricting access to certain programs/applications) through interaction with blocker device 102A. Upon subsequent interaction with blocker device 102B, user device 120A may then be placed in a second configuration (e.g., providing unrestricted access to user device 120A). Thus, user device 120A may be restricted with one blocker device and unlocked with another blocker device.

In such embodiments, both blocker device 102A and blocker device 102B may be paired with user device 120A and may be indicated to be associated with each other to user device 120A, to prevent any random blocker device from changing the configuration of user device 120A. User device 120A may then authenticate each individual blocker device when the blocker device is disposed proximate to user device 120A. When changing from a previous restricted access configuration (e.g., the first configuration) to another configuration (e.g., the second configuration, which may be an unrestricted access configuration), authentication of blocker device 102B may be performed and, upon determination that blocker device 102B is associated with blocker device 102A, the configuration of user device 120A may be changed.

In certain embodiments, blocker device 102 may include a user interface, such as one or more buttons, touchscreens, microphones, cameras, and/or other elements where a user may interact or provide commands to blocker device 102. Such user interfaces may allow for a user to set the various configurations for each associated user device. For example, blocker device 102 may include a screen and a plurality of buttons that allows a user to indicate whether a program/application, hardware, or other element of user device 102 is affected (e.g., turned on or off) by the various configurations.

Based on user device 120A detecting blocker device 102A located proximate user device 120A (e.g., based on communications module 226A receiving data from signal module 106A of blocker device 102A) user device 120A may be placed in one of first configuration or the second configuration associated with blocker device 102A. Alternatively, based on user device 120A detecting blocker device 102B located proximate user device 120A (e.g., based on communications module 226A receiving data from signal module 106A of blocker device 102B) user device 120A may be placed in one of first configuration or the second configuration associated with blocker device 102B.

In certain embodiments, user device 120 may be communicatively coupled to additional devices, such as server device 240, secondary device 250, and/or location server 260.

Server device 240 may be, for example, a server that may store configuration data for user device 120. Thus, for example, user device 120 may, upon selection of details of the configurations, communicate configuration data to server device 240 for storage. User device 120 may then access the configuration data from server device 240 (e.g., via an API call) upon detection of the blocker device 102 proximate user device 120. User device 120 may then be placed in the appropriate configuration.

Additionally or alternatively, user device 120 may include a certain program/application that is configured to perform operations of the techniques described herein, such as detection and authentication of blocker device 102 and selecting and placing user device 120 in the appropriate configuration based on such detection and authentication. Server device 240 may be configured to provide such program/application to user device 120 and may be configured to periodically update such program/application as well.

In certain embodiments, server device 240 may communicate certain configurations or configuration requirements. For example, server device 240 may store configuration data associated with a particular venue. Such a venue may not allow flash photography. According, upon detection of an appropriate blocker device 102 (e.g., a blocker device belonging to the venue) proximate user device 120, user device 120 may query server device 240 to provide configuration data. Such configuration data may disable all lights on user device 120 to prevent flash photography. User device 120 may then be placed in such a configuration until an appropriate blocker device 102 is detected again.

Secondary device 250 may be a device communicatively coupled to user device 120, but not to blocker device 102. For example, secondary device 250 may be a device that does not include the appropriate hardware to communicate with signal module 106 of blocker device 102. Thus, changing the configuration of secondary device 250 may be accomplished through interacting blocker device 102 with user device 120. User device 120 may then communicate data indicating the interaction with blocker device 102 to secondary device 250. Secondary device 250 may then set itself in the appropriate configuration based on the interaction.

In certain embodiments, secondary device 250 may also be configured to indicate certain conditions. For example, secondary device 250 may communicatively couple with user device 120 and provide special conditions for usage of user device 120. Thus, secondary device 250 may indicate locations of a sensitive area, school, performance venue, sporting stadium, or other special use situation. Based on the indication of secondary device 250, user device 120 may then access server device 240 for the appropriate configuration. As each user device may include a different mix of hardware and software, secondary device 250 may not provide data for the appropriate configuration. Instead, server device 240 may, by accessing hardware and download records (e.g., from an application download store) determine the mix of hardware and software of user device 120 and provide the appropriate configuration data.

In certain embodiments, location module 230 of user device 120 may receive location data (e.g., GPS data) from location server 260. Location server 260 may be, for example, a GPS satellite for user device 120 to determine its position or a server that provides location data to user device 120 (e.g., based on triangulation). Based on the location determined, user device 120 may determine the appropriate location and, upon interaction with blocker device 102, set user device 120 in the appropriate configuration (e.g., by setting a configuration appropriate for the requirements of the location and/or accessing server device 240 to obtain the configuration appropriate to the location). Accordingly, user device 120 may determine its location and select the appropriate configuration upon interaction with blocker device 102.

Device Examples

Figure 3:
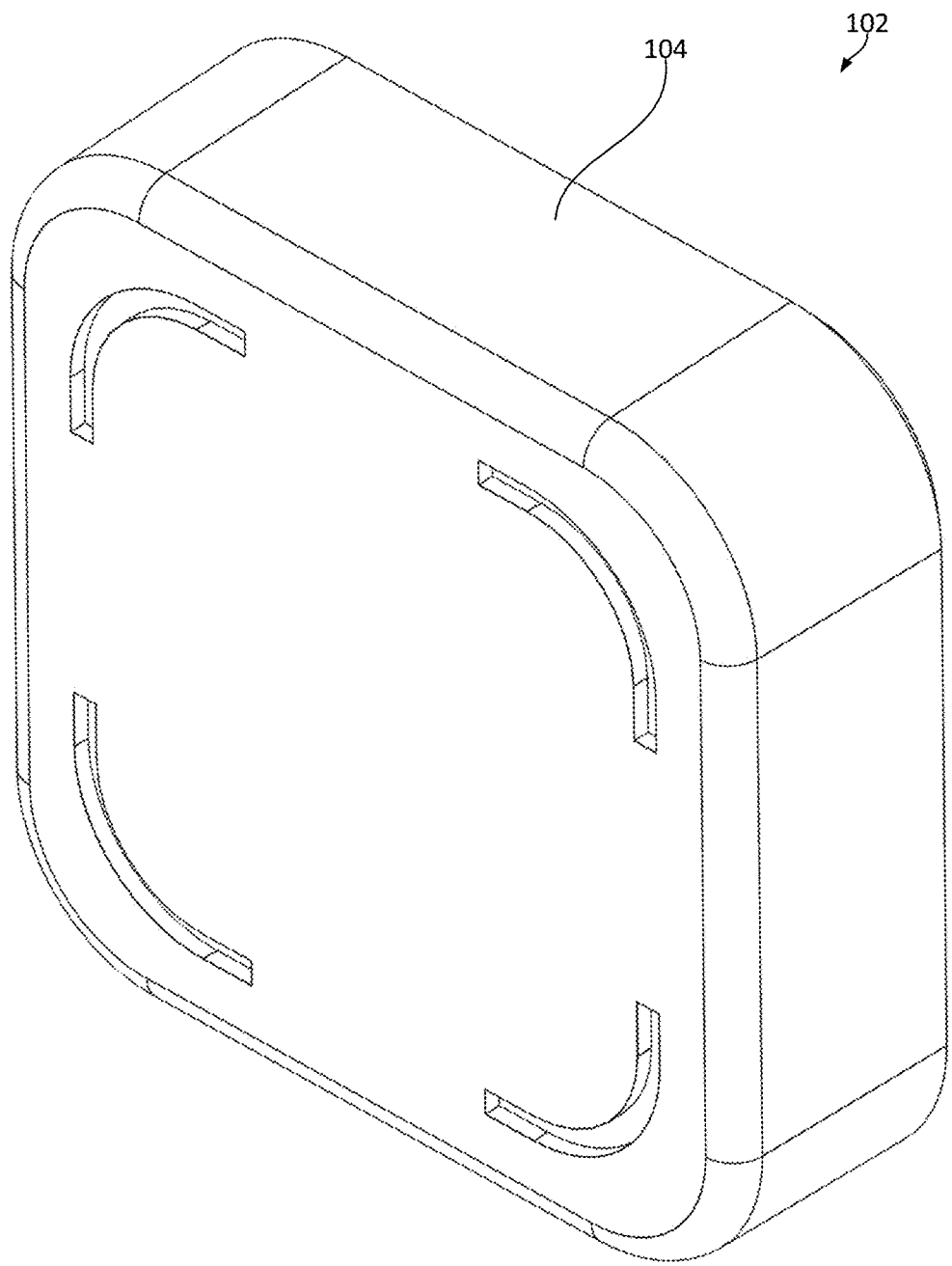
FIG. 3 illustrates a perspective view of a blocker device, in accordance with certain embodiments.

FIG. 3 illustrates a perspective view of a blocker device, in accordance with certain embodiments. FIG. 3 illustrates an embodiment of blocker device 102 that is a handheld device that includes body 104. Body 104 may contain the various elements of blocker device 102, such as a signal module, a magnet, memory, and/or other elements. It is appreciated that, in other embodiments, blocker device 102 may be a fixed device (e.g., built in as part of a building), a movable device (e.g., a movable entrance gate), or integrated into an electronic device (e.g., integrated into a smartphone).

Figure 4:
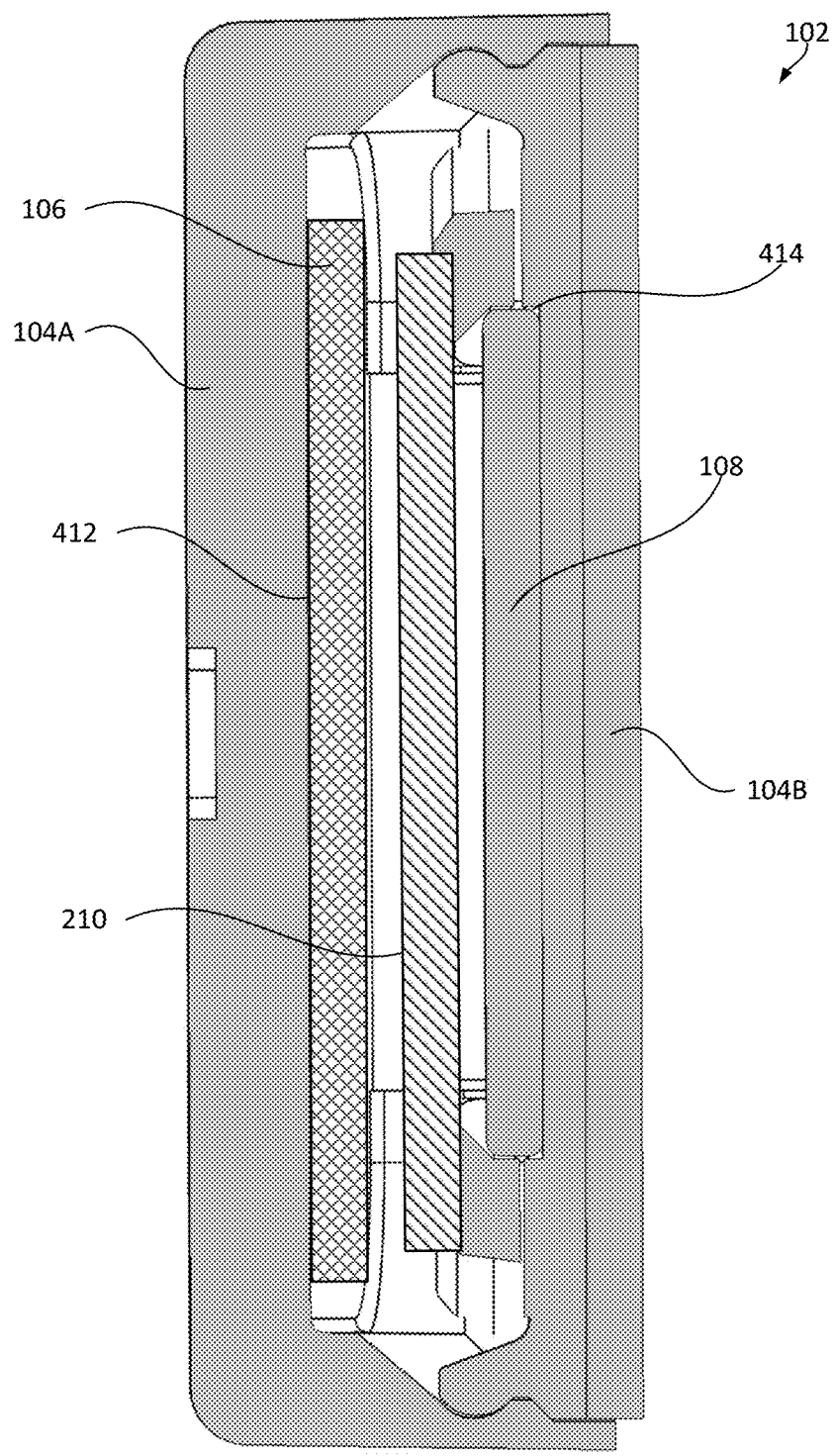
FIG. 4 illustrates a cutaway view of a blocker device, in accordance with certain embodiments.

FIG. 4 illustrates a cutaway view of a blocker device, in accordance with certain embodiments. FIG. 4 illustrates a cutaway view of blocker device 102 that includes body 104, signal module 106, magnet 108, and memory 210.

Body 104 may be as described herein and may include a plurality of portions. For example, body 104 may include first body portion 104A and second body portion 104B. First body portion 104A and second body portion 104B may be coupled together to form body 104. Such coupling may be via any technique described herein, such as welding, adhesives, mechanical fasteners, snaps, and/or other techniques.

Signal module 106 may be any signal emitting element described herein and, in various embodiments, may be configured to communicate via any one, some, or all such communication protocols, such as NFC, Bluetooth, Near-Field Communications, WiFi, Zigbee, 3G, 4G, 5G, and/or other such appropriate communications protocols. Signal module 106 may be configured to actively (e.g., based on a predetermined logic) or passively (e.g., based on outside stimulus, such as in response to a magnetic field) emit such signals. In certain embodiments, signal module 106 may be, for example, an NFC chip. Other embodiments of signal module 106 may include chips that emit signals via other protocols and may include, in certain such embodiments, a printed circuit board (PCB) or other supporting hardware.

Signal module 106 may be coupled to a portion of body 104, such as body 104A. In various embodiments, signal module 106 may be coupled to the portion of body 104 via any coupling technique 412 described herein, such as adhesives, mechanical fasteners, friction fits, and/or other such techniques.

Magnet 108 may be a magnet configured to allow for blocker device 102 to couple to a magnetic surface, as described herein. Magnet 108 may be coupled to a portion of body 104, such as body 104B. For example, magnet 108 may be disposed within depression 414 of body 104B. In certain embodiments, magnet 108 may be coupled to the portion of body 104 via any coupling technique described herein, such as friction fits or adhesives.

In certain embodiments where body 104 includes a plurality of portions, such as first body portion 104A and second body portion 104B, signal module 106 may be coupled to first body portion 104A and magnet may be coupled to second body portion 104B. Accordingly, signal module 106 and magnet 108 may be disposed on opposite sides of a cavity within body 104.

Memory 210 may be a memory configured to store data, such as authentication data for associated devices as well as configuration data in certain embodiments. In certain embodiments, memory 210 may be a separate memory module (e.g., a hard drive, solid state drive, or other element that allows for write and read access). Other embodiments may include memory 210 within signal module 106. For example, signal modules such as NFC or Bluetooth modules may include native memory and such memory may store appropriate data as described herein.

Figure 5:
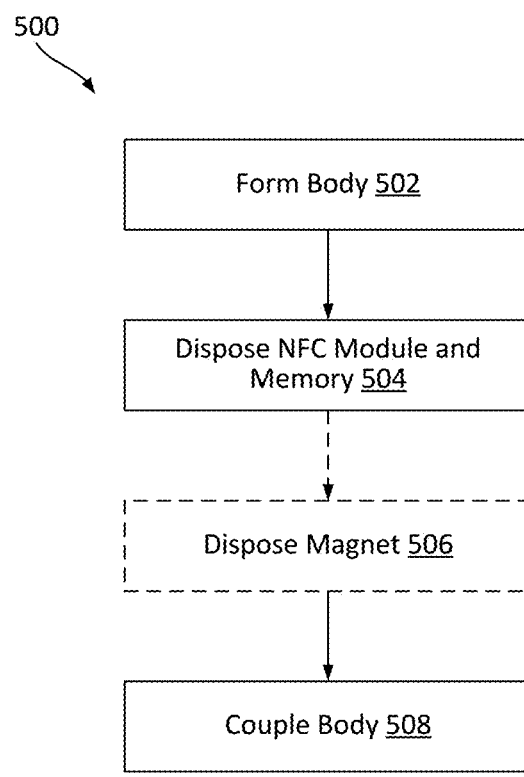
FIG. 5 is a flowchart illustrating an example of manufacturing a blocker device, in accordance with certain embodiments.

FIG. 5 is a flowchart illustrating an example of manufacturing a blocker device, in accordance with certain embodiments. FIG. 5 illustrates technique 500 for manufacturing a blocker device. The blocker device described in technique 500 may be, for example, a handheld blocker device.

In 502, the body of the blocker device is formed. The body may, in various embodiments, be formed through molding, three-dimensional printing, casting, machining, composite lay-up, and/or any other appropriate technique. Certain embodiments of the body may include a plurality of different parts and such parts may be separately formed and coupled together via welding, adhesive joining, mechanical fasteners, snap features, and/or any other appropriate technique.

In 504, the NFC module and/or any appropriate memory may be disposed within the blocker device, such as coupled to a portion of the body of the blocker device. NFC module and/or the memory may be coupled to the portion of the body in a manner that results in a fixed distance relationship between the portion of the body and the NFC module and/or the memory. Such coupling may be according to any of the techniques described herein. In optional 506, a magnet may a coupled to a portion of the body, according to the techniques described here.

In 508, for embodiments of with a plurality of portions of the body, once items have been coupled or disposed within the portions of the body, the various portions may be coupled together. Such coupling may be via any of the techniques described herein.

Operational Techniques

Figure 6:
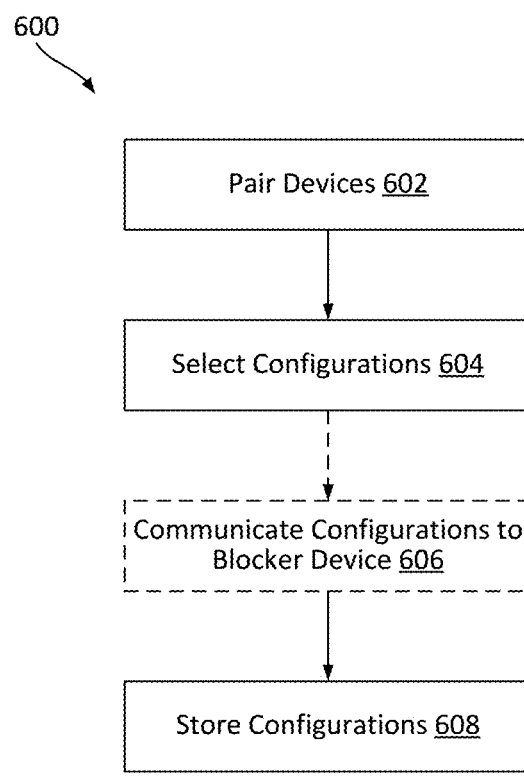
FIG. 6 is a flowchart illustrating an example of configuring a blocker device, in accordance with certain embodiments.

FIG. 6 is a flowchart illustrating an example of configuring a blocker device, in accordance with certain embodiments. FIG. 6 illustrates technique 600 where a blocker device is configured to interface with a user device.

In 602, the blocker device and the user device are paired. Pairing of the devices may include onboarding of the blocker device to the user device in a manner where the user device would recognize the blocker device in subsequent interactions. Thus, for example, authentication data associated with the blocker device, such as a security tag (e.g., an NFC tag), a challenge-response technique, and/or another such technique may be introduced from the blocker device to the user device so that the user device may verify the identity of the blocker device in subsequent interactions.

In various embodiments, such authentication data may be static data (e.g., data may be fixed over time) or may be periodically refreshed (e.g., a new code may be provided per each contact). Upon pairing, the user device may receive the proper data to authenticate the blocker device. For example, the authentication data may include a hashed digital signature (e.g., using SHA256 protocol). The hashed digital signature may be a generated private key. The blocker device may be associated with a unique identifier (UUID) and the UUID may be signed by the hashed digital signature (e.g., during manufacturing) of the private key to create a digital signature. The signed UUID and/or the digital signature may be written into memory of the blocker device (e.g., the separate memory and/or the memory of the signal module).

In 604, various configurations of the user device may be specified. For example, the user device may include a user interface and a user of the user interface may specify the programs/applications, hardware, and/or inputs/instructions that are made available for or prevented from for each configuration.

Thus, for example, a first configuration of the user device may lock all programs/applications of the user device. A second configuration of the user device may provide access to all programs/applications and functionality of the user device. A third configuration of the user device may turn off all programs/applications that receive or upload external data. A fourth configuration of the user device may only allow access to certain programs/applications that are stored within the user device, such as educational software. It is appreciated that such examples are for illustrative purposes only and that other configurations of the user device are contemplated and within the scope of this disclosure.

In certain embodiments, such configurations may be stored within the user device (e.g., within a memory of the user device) and may be accessed upon determination and authentication of the blocker device being positioned proximate the user device. Thus, upon such a determination, the user device may access the memory for the appropriate configuration. The selection of the appropriate configuration may be according to, for example, previous or current user inputs provided to the user device or blocker device, according to a predetermined pattern (e.g., cycling between a first and second configuration, or through another predetermined pattern), or through another pattern.

In optional 606, such configurations may be communicated to the blocker device. In such an embodiment, the blocker device may store the configuration data in 608. Thus, the blocker device may store such configurations and communicate data indicating the appropriate configuration during interaction with the user device. Thus, for example, the blocker device may determine that the user device is in a second configuration and, upon interaction with the user device, provide data indicating details of the first configuration to cause the user device to be placed in the first configuration. Upon a subsequent interaction with the user device, the blocker device may provide data indicating details of the second configuration to place the user device in the second configuration.

Otherwise, data associated with the configurations may be stored on the user device and/or communicated to a third party storage device, such as a server device, in 608. The user device may access the data upon interactions with the blocker device (e.g., detection of the blocker device being position proximate the user device via, for example, signal data communicated by the blocker device).

Figure 7:
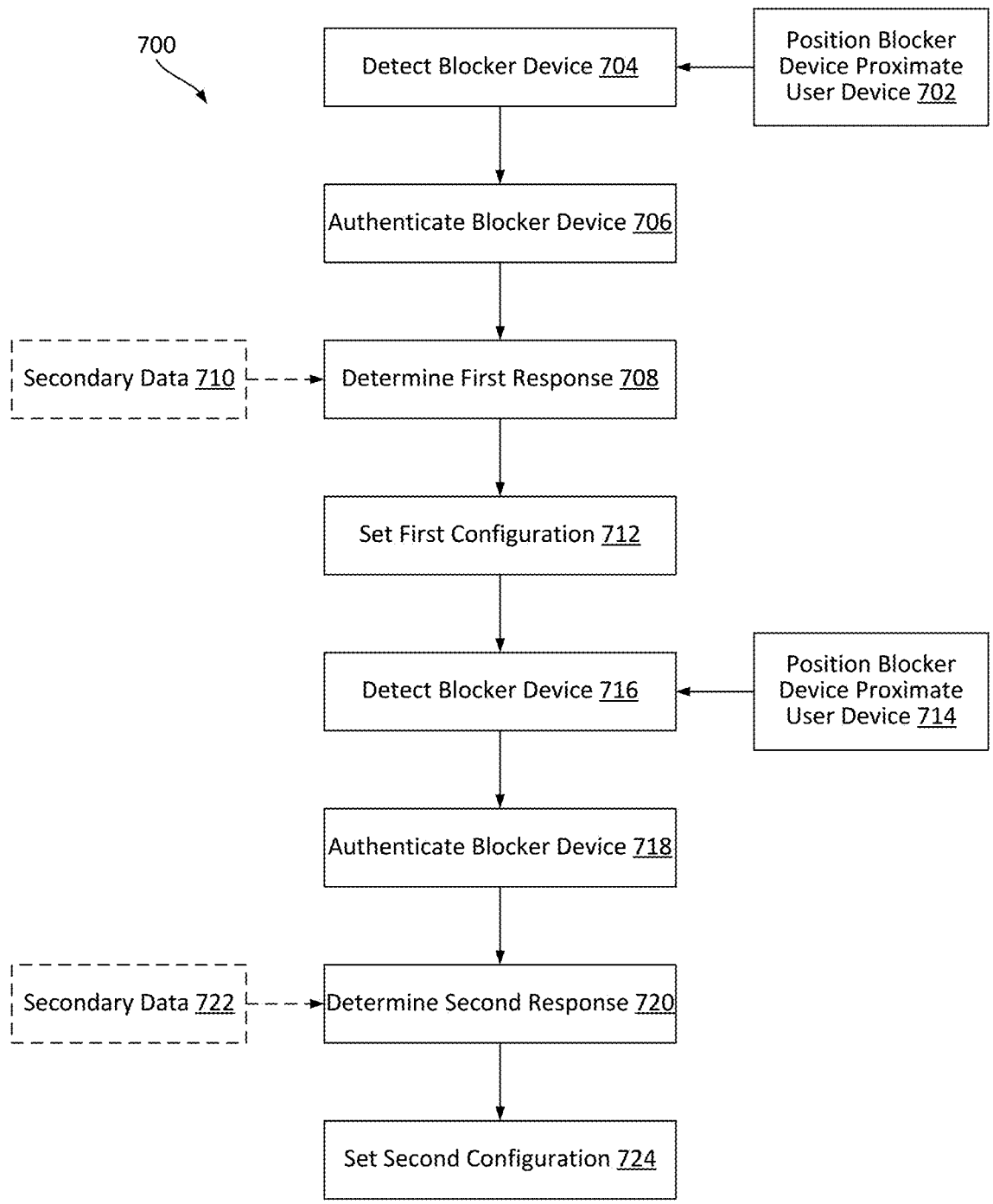
FIG. 7 is a flowchart illustrating an example of using a blocker device, in accordance with certain embodiments.

FIG. 7 is a flowchart illustrating an example of using a blocker device, in accordance with certain embodiments. FIG. 7 illustrates technique 700 where a blocker device is configured to interacts with a user device to cause the user device to be placed in certain configurations.

In 702, the blocker device is positioned proximate the user device (e.g., within a distance of less than 10 feet, such as within less than one foot of distance). In various embodiments, the blocker device may be a handheld device and either the blocker device and/or the user device may be moved to be positioned proximate each other. In other embodiments, the blocker device may be fixed in position and the user device may be moved to be proximate the blocker device (e.g., a user may carry the user device past a gate containing the blocker device).

In 704, the user device may scan the blocker device and/or the blocker device may emit a signal (e.g., with the signal module) and the user device may detect the signal to determine that the blocker device is positioned proximate the user device. In certain embodiments, the signal may be a short-range communication protocol and, thus, the blocker device may need to be positioned within range for the signal to be detected by the user device to be effectively determined to be proximate the user device.

In certain such embodiments, the user device may be configured to determine a distance or a rough distance of the blocker device from the user device. The blocker device may be required to be within a threshold distance (e.g., less than 1 foot, less than 6 inches, or another threshold distance) from the user device in order for the user device to determine that the blocker device is sufficiently close to the user device to continue with technique 700.

Furthermore, in certain embodiments, the user device may determine the presence of the blocker device as long as the blocker device is positioned within a threshold distance of the user device (e.g., within range for a magnetic field generated by the communication module of the user device to excite and cause the signal module of the blocker device to emit a signal in response to the magnetic field).

Other embodiments of the user device may require the blocker device to be moved in a certain manner proximate the user device, such as passing the blocker device from one end of the user device to the other end of the user device. Thus, for example, the communication module of the user device may be configured to detect a signal strength of the signal data communicated by the signal module and determine relative movement between the blocker device and the user device based on the change in signal strength. In such an embodiment, the user device may only determine that the blocker device is properly positioned proximate the user device if such movement or changes in signal strength are determined.

In 706, the user device may authenticate the blocker device to determine the identity of the blocker device to confirm that the blocker device is associated (e.g., previously paired) with the user device. For user devices associated with a plurality of different blocker devices, the authentication process may allow the user device to determine which of the associated blocker devices is positioned proximate the user device.

When the user device interacts with the blocker device (e.g., when scanning the signal module of the blocker device with the user device and/or when the signal module of the blocker device emits a signal), the user device (e.g., via a program/application) may receive the UUID and/or the digital signature and verify the signature. The user device may then verify a match with a previous UUID and/or the digital signature previously received by the user device (e.g., in 602 of FIG. 6). For example, the UUID and/or the digital signature may be hashed with SHA256 and a public key utilized to verify that the UUID and/or digital signature received from the blocker device in 706 matches the hash of the previously received UUID and/or digital signature. Authentication may be confirmed upon a successful match.

In 708, based on detection of the blocker device located proximate the user device, a first response for the user device may be determined. The first response may include, for example, placing the user device in a first configuration. The first configuration may change the operational capabilities of the user device (e.g., by preventing or allowing access to programs/applications, hardware, and/or other capabilities of the user device) according to the techniques described herein.

In certain embodiments, the configuration that the device is to be placed into may be a configuration that excludes operation of certain elements of the user device (e.g., shuts off access to programs/applications and/or hardware). Other embodiments of the configuration may affirmatively require operation of certain elements of the user device (e.g., a tracking application of the user device may be required to be turned on). It is appreciated that both exclusive and inclusive elements of the configuration may be utilized and/or mixed in various configurations.

Embodiments where the user device is configured to determine relative movement to the blocker device may also determine the appropriate response based on the type of movement detected. Thus, the user device's first response may select a first configuration if the blocker device is determined to be moving from a top to a bottom of the user device while the user device's first response may select a second configuration if the blocker device is determined to be moving from the bottom to the top of the user device.

In various embodiments, secondary data may be received from another device, such as a location server, a secondary device, and/or a server device, in option 710. Such secondary data may provide further information as to the first response of the user device, such as details of the configuration and which configuration should be selected for the first response.

Thus, for example, while certain embodiments may store configuration data on the user device or allow for the blocker device to provide configuration data, other embodiments may have a server provide configuration data in response to determination of the position of the blocker device in 702.

In certain such embodiments, the configurations communicated by the server may be in response to specific requirements of a location or venue. Such location or venue may be associated with the blocker device and, thus, allow for a determination of the location of the user device. Additionally or alternatively, location data may be provided to the user device that allows for the user device to determine the specific location. In certain such embodiments, geofencing may be utilized so that a location module of the user device may determine when the user device is located within a specific geofence. The server associated with the geofence may then be queried to determine the configuration requirements for the geofenced area and/or a server device may provide a configuration that meets the requirements of the geofenced area to the user device.

In certain embodiments, a secondary device communicatively coupled to user device may not be configured to receive signals from the blocker device (e.g., if the secondary device does not include the appropriate hardware to communicate with the signal module of blocker device). Changing the configuration of secondary device may thus be accomplished through interacting the blocker device with the user device and the user device communicating data indicating the interaction with the blocker device to the secondary device.

Based on the determination of the first response, the first configuration may be set in 712. Thus, the user device may be set in the configuration determined in 708. Alternatively, the user device may cause a secondary device to be set in the configuration determined in 708. Setting of the restrictive device into the first configuration may be according to the techniques described herein. In various embodiments, the user device may automatically set the user device and/or the secondary device into the first configuration, without input from a user.

In various embodiments, the disclosure provided for 702 to 712 may apply to 714 to 724. That is, disclosure that applies to 702 to 712 may also be applicable to 714 to 724. In technique 700, 702 may correspond to 714, 704 may correspond to 716, 706 may correspond to 718, 708 may correspond to 720, 710 may correspond to 722, and 712 may correspond to 724. It is appreciated that, where the description for each of 702 to 712 may include a plurality of possible implementations, one, some, or all such description may be utilized in corresponding 714 to 724.

Furthermore in 720, in certain embodiments, the second response may include determination of a second configuration. The second configuration may be different from the first configuration. Thus, for example, if the first configuration includes restriction of certain programs/applications and/or hardware, the second configuration may include restriction of different programs/applications and/or hardware or may reset the user device to provide unrestricted access to the programs/applications and/or hardware. Accordingly, the user device may be set in the second configuration in 724.

Computing System Example

Figure 8:
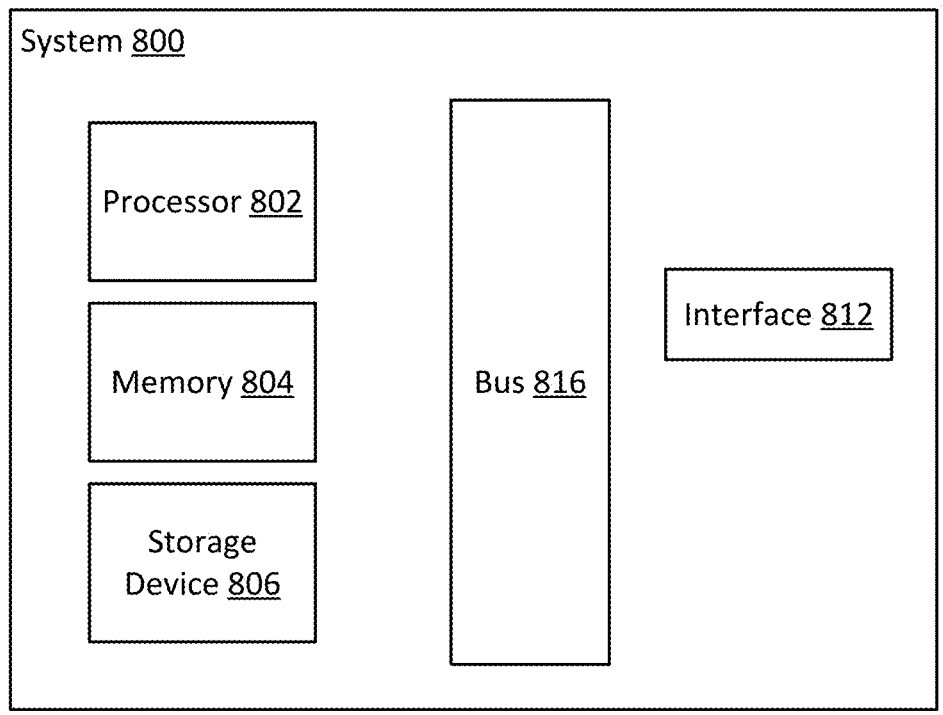
FIG. 8 illustrates a block diagram of an example computing system, in accordance with certain embodiments.

FIG. 8 illustrates a block diagram of an example computing system, in accordance with certain embodiments.

FIG. 8 illustrates a block diagram of an example computing system, in accordance with certain embodiments. According to various embodiments, a system 800 suitable for implementing embodiments described herein includes a processor 802, a memory module 804, a storage device 806, an interface 812, and a bus 816 (e.g., a PCI bus or other interconnection fabric.) System 800 may operate as variety of devices such as a server system such as an application server and a database server, a client system such as a laptop, desktop, smartphone, tablet, wearable device, set top box, etc., or any other device or service described herein.

Although a particular configuration is described, a variety of alternative configurations are possible. The processor 802 may perform operations such as those described herein. Instructions for performing such operations may be embodied in the memory 804, on one or more non-transitory computer readable media, or on some other storage device. Various specially configured devices can also be used in place of or in addition to the processor 802. The interface 812 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. A computer program product comprising non-transitory computer-readable medium storing program code configured to be executed by one or more processors to cause a user device to perform operations comprising:
receiving first signal data communicated by a signal module of a first blocker device disposed proximate the user device, wherein the first signal data comprises a first security tag associated with the first blocker device;
authenticating the first blocker device based on the first security tag of the first signal data;
automatically selecting, based on the receiving the first signal data and the authenticating the first blocker device, a first configuration of the user device, wherein the first configuration prevents a user from interacting with at least one application of the user device;
automatically setting the user device into the first configuration;
receiving second signal data communicated by the signal module of the first blocker device disposed proximate the user device, wherein the second signal data comprises a second security tag associated with the first blocker device, wherein the second security tag is a periodic refresh of the first security tag and is different from the first security tag;
authenticating the first blocker device based on the second security tag of the second signal data;
automatically selecting, based on the receiving the second signal data and the authenticating the second security tag, a second configuration of the user device, wherein the second configuration is different from the first configuration; and
automatically setting the user device into the second configuration.

2. The computer program product of claim 1, wherein the first signal data is Near Field Communications (NFC) data, and wherein the first security tag is an NFC protocol first security tag.

3. The computer program product of claim 1, wherein the first signal data further comprises configuration data identifying applications that a user is prevented from accessing when the user device is set in the first configuration, and wherein the first configuration is based on the configuration data communicated by the signal module of the first blocker device.

4. The computer program product of claim 1, wherein the second configuration provides the user full access to the user device.

5. The computer program product of claim 1, wherein the operations further comprise:

receiving third signal data communicated by a signal module of a second blocker device disposed proximate the user device, wherein the third signal data comprises a third security tag associated with the second blocker device;
authenticating the second blocker device based on the third security tag of the third signal data, the authenticating the second blocker device comprising determining that the second blocker device is associated with the first blocker device for interacting with the user device;
automatically selecting, based on the receiving the third signal data and the authenticating the second blocker device, a third configuration of the user device, wherein the third configuration is different from the first configuration; and
automatically setting the user device into the third configuration.

6. The computer program product of claim 1, wherein the first configuration is stored and accessed from a memory of the user device.

7. The computer program product of claim 1, wherein the first configuration is provided by the blocker device.

8. A blocker device, comprising:
a body comprising a first body portion and a second body portion; and
a signal module, coupled to the first body portion, wherein the signal module is configured to:
provide first signal data to be received by a user device disposed proximate the blocker device, wherein the first signal data comprises a first security tag associated with the blocker device and further comprises first configuration data identifying applications that a user is prevented from accessing when the user device is set in a first configuration and wherein the first signal data is configured to cause the user device to:
authenticate the blocker device based on the first security tag of the signal data; and
automatically set the user device into the first configuration based on the user device receiving the first signal data and the authenticating the first security tag, wherein the first configuration is based on the first configuration data communicated by the signal module of the first blocker device.

9. The blocker device of claim 8, further comprising:
a memory configured to store the first configuration data.

10. The blocker device of claim 9, wherein the memory is internal memory of the signal module.

11. The blocker device of claim 9, wherein the memory is physically separate from the signal module.

12. The blocker device of claim 8, wherein the first signal data is Near Field Communications (NFC) data, and wherein the first security tag is an NFC protocol first security tag.

13. The blocker device of claim 8, further comprising:
a magnet, coupled to the second body portion.

14. A user device comprising:
a communications module;
a non-transitory memory; and
a processor, configured to receive instructions from the non-transitory memory to perform operations comprising:
receiving first signal data communicated by a signal module of a first blocker device disposed proximate the user device, wherein the first signal data comprises a first security tag associated with the first blocker device;
authenticating the first blocker device based on the first security tag of the first signal data;
automatically selecting, based on the receiving the first signal data and the authenticating the first blocker device, a first configuration, wherein the first configuration prevents a user from interacting with at least one application;
automatically setting the first configuration;
receiving second signal data communicated by the signal module of the first blocker device disposed proximate the user device, wherein the second signal data comprises a second security tag associated with the first blocker device, wherein the second security tag is a periodic refresh of the first security tag and is different from the first security tag;
authenticating the first blocker device based on the second security tag of the second signal data;
automatically selecting, based on the receiving the second signal data and the authenticating the second security tag, a second configuration of the user device, wherein the second configuration is different from the first configuration; and
automatically setting the user device into the second configuration.

15. The user device of claim 14, wherein the first signal data is Near Field Communications (NFC) data, and wherein the first security tag is an NFC protocol first security tag.

16. The user device of claim 14, further comprising:
a location module, wherein the operations further comprise:
receiving, with the location module, location data indicating a location of the user device; and
determining the location of the user device, wherein the first configuration is further selected based on the location of the user device.

17. The user device of claim 14, wherein the automatically setting the first configuration comprises automatically setting the user device into the first configuration.

18. The user device of claim 14, wherein the automatically setting the first configuration comprises:
providing, with the communications module, the first configuration to a secondary device, wherein the automatically setting the first configuration comprises causing the secondary device to be automatically set in the first configuration.

19. The user device of claim 14, wherein the second configuration provides the user full access to the user device.

20. The user device of claim 14, wherein the first signal data further comprises configuration data identifying applications that a user is prevented from accessing when the user device is set in the first configuration, and wherein the first configuration is based on the configuration data communicated by the signal module of the first blocker device.

* * * * *